United States Patent
Robinson

(10) Patent No.: US 8,118,239 B2
(45) Date of Patent: Feb. 21, 2012

(54) POTABLE WATER HEATER

(75) Inventor: Edgar C. Robinson, Vancouver (CA)

(73) Assignee: International Thermal Investments Ltd., Richmond, British Columbia (CA)

( * ) Notice: Subject to any disclaimer, the term of this patent is extended or adjusted under 35 U.S.C. 154(b) by 718 days.

(21) Appl. No.: 10/848,780

(22) Filed: May 18, 2004

(65) Prior Publication Data

US 2005/0258263 A1  Nov. 24, 2005

(51) Int. Cl.
*F24H 1/20* (2006.01)
*G05D 23/00* (2006.01)

(52) U.S. Cl. ..... 237/12.3 B; 237/19; 237/16; 122/13.01; 122/18.3; 122/19.1; 122/87

(58) Field of Classification Search ............... 126/101; 165/41, 42; 237/2 A, 12.3 R, 12.3 B, 12.3 C, 237/16, 19; 122/13.01, 19.1, 18.3
See application file for complete search history.

(56) References Cited

U.S. PATENT DOCUMENTS

| | | | |
|---|---|---|---|
| 3,630,175 A * | 12/1971 | Reid et al. | 122/250 R |
| 3,758,031 A | 9/1973 | Moran | |
| 3,903,868 A * | 9/1975 | Salvo | 122/18.31 |
| 4,264,826 A * | 4/1981 | Ullmann | 290/2 |
| 4,360,003 A * | 11/1982 | Hardy | 126/367.1 |
| 4,479,605 A * | 10/1984 | Billotte et al. | 237/8 R |
| 4,771,762 A * | 9/1988 | Bridegum | 122/14.22 |
| 4,925,092 A * | 5/1990 | Yoshida et al. | 237/12.3 B |
| 4,925,093 A * | 5/1990 | Moore et al. | 237/19 |
| 4,993,402 A * | 2/1991 | Ripka | 122/18.2 |
| 5,025,985 A * | 6/1991 | Enander | 237/2 A |
| 5,207,212 A * | 5/1993 | Woollen, Jr. | 122/18.3 |
| 5,226,594 A * | 7/1993 | Swenson | 237/2 B |
| 5,363,836 A * | 11/1994 | Briggs | 126/109 |
| 5,485,879 A * | 1/1996 | Lannes | 122/18.31 |
| 5,544,645 A * | 8/1996 | Armijo et al. | 126/101 |
| 5,924,390 A * | 7/1999 | Bock | 122/17.2 |
| 6,283,067 B1 * | 9/2001 | Akkala | 122/14.22 |
| 6,561,182 B2 * | 5/2003 | Wong | 126/360.1 |
| 6,612,504 B2 * | 9/2003 | Sendzik | 237/12.3 B |
| 6,732,940 B2 * | 5/2004 | Enander et al. | 237/2 A |
| 6,883,467 B2 * | 4/2005 | Holden | 122/3 |
| 7,036,746 B2 * | 5/2006 | Murgu et al. | 237/12.3 B |

FOREIGN PATENT DOCUMENTS

| | | |
|---|---|---|
| CA | 305053 | 10/1930 |
| CA | 506386 | 10/1954 |
| CA | 1118026 | 2/1982 |
| CA | 1293987 | 1/1992 |
| CA | 2129283 | 4/1999 |
| CA | 2269106 | 10/1999 |
| CA | 2415905 | 7/2004 |
| WO | WO90/09901 | 9/1990 |

* cited by examiner

*Primary Examiner* — Steven B McAllister
*Assistant Examiner* — Nikhil Mashruwala
(74) *Attorney, Agent, or Firm* — John Russell Uren

(57) ABSTRACT

A water heater for heating potable water used in a boat or vehicle. Exhaust heated by the burner of the water heater is discharged from the burner and is conveyed through an exhaust duct which extends through a water jacket surrounding the burner and which water jacket holds the potable water to be heated. The potable water is heated by the burner and also by the hot exhaust gases in the exhaust duct. Operating components are accessible from one end of the water heater.

3 Claims, 5 Drawing Sheets

POTABLE WATER HEATER

This invention relates to a improved hot water heater and, more particularly, to an improved hot water heater for marine or vehicle use and which utilises diesel fuel for heating potable water and which heater utilises the exhaust of the burner to improve the efficiency of the heating process.

BACKGROUND OF THE INVENTION

Hot water heaters for heating potable water for use in cooking, showers, baths and the like, and which potable water heaters are used in recreational vehicles, boats, motor homes and other vehicles are, of course, well known. The fuel typically used in such heaters is electric power or propane. The disadvantages in using propane are well known since propane is maintained in its liquid state by a pressurized storage vessel. In a boat, the gas, being heavier than air, will accumulate in the lower portions of the boat in the event there is a leak. The fuel is volatile and if it is ignited, an explosion may occur. More mundane considerations include the fact that propane fuel is not readily available. Statutes and local regulations may require that such fuels be stored under stringent conditions and commercial outlets are therefore not always at hand.

Yet a further consideration is the efficiency of the potable water heater itself. In a boat or vehicle, the space available for a water heater is at a premium. It is desirable to have the water heater take up a relatively small volume.

SUMMARY OF THE INVENTION

According to one aspect of the invention, there is provided a hot water heating system for heating potable water, said heater being diesel powered and comprising a burner, an exhaust stack carrying hot exhaust emanating from said burner, a water jacket surrounding said burner for carrying potable water and being enclosed by an outer periphery, said exhaust stack running from said burner through said water jacket, said exhaust stack carrying said hot exhaust through said water jacket and discharging said hot exhaust from said outer periphery of said water jacket.

According to a further aspect of the invention, there is provided a hot water heating system with a burner and operating components associated with said burner, said burner and said operating components being located within a housing, said operating components being located at and accessible form one end of said heating system upon removal of a portion of said housing.

According to yet a further aspect of the invention, there is provided a method of increasing the temperature of potable water used for human consumption, said potable water being carried in a water jacket surrounding a burner having a peripheral housing and which burner discharges hot exhaust from said peripheral housing, burner through said water jacket to said peripheral housing and discharging said hot exhaust from said peripheral housing.

According to still yet a further aspect of the invention, there is provided a hot water heater for heating potable water for human consumption, said heater being diesel powered and comprising a burner, an exhaust stack carrying hot exhaust emanating from said burner, a water jacket surrounding said burner for carrying potable water and being enclosed by an outer periphery and end portions on opposite ends of said burner in contact with said potable water, each of said end portions having a concave inside surface contacting said potable water in said water jacket.

According to still yet a further aspect of the invention, there is provided a hot water heating system for heating potable water, said heater being diesel powered and comprising a burner, an exhaust stack carrying hot exhaust emanating from said burner, a water jacket surrounding said burner for carrying potable water and being enclosed by an outer periphery, said exhaust stack running from said burner through said water jacket, said exhaust stack carrying said hot exhaust through said water jacket and discharging said hot exhaust from said outer periphery of said water jacket.

According to yet a further aspect of the invention, there is provided a water level sensor in a potable water and diesel powered heater, said water level sensor producing a signal when said water within said heater is beneath a predetermined level, said signal being operable to terminate operation of said heater.

According to a further aspect of the invention, there is provided a coolant heater for heating coolant and circulating said heated coolant through a boat, vehicle or other living area, said coolant heater comprising a coolant stack carrying gases from a burner, said coolant stack being located within a coolant jacket and said coolant stack terminating in an exhaust stack releasing said hot gases to the atmosphere, said coolant stack being in a configuration that allows said exhaust stack to exit said water heater at at least two exhaust stack exit locations.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
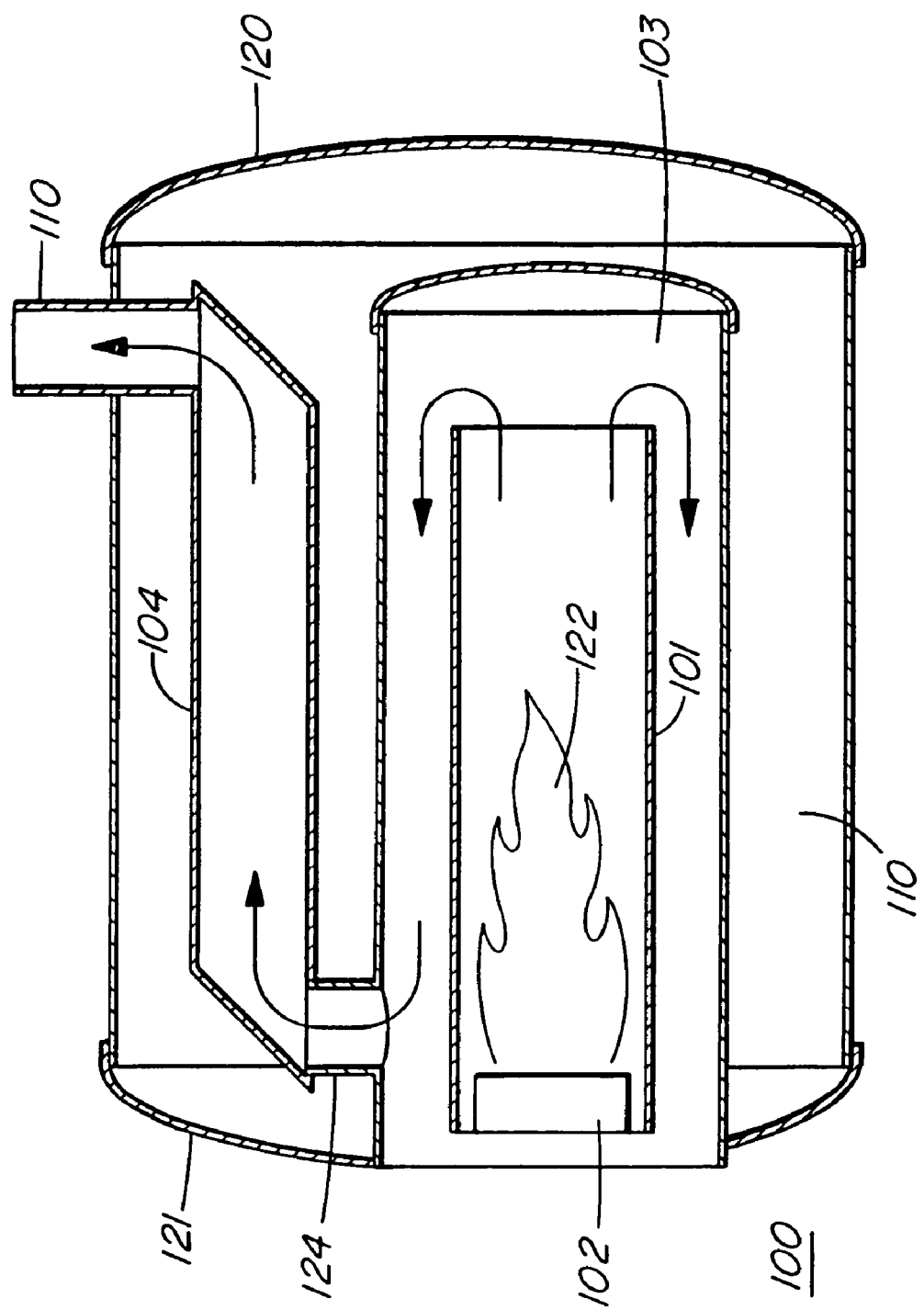
FIGS. 1A and 1B are diagrammatic side and end views, respectively, of a potable water heater according to the invention.

Referring now to the drawings, the potable water heating system is generally illustrated at 100 in FIG. 1A. The exhaust is created by a centrally located burner 101 which is conveniently diesel fuel powered and which burner 101 utilises pressurized air for the nozzle 102 where the diesel fuel and the air combine to provide the combustion flame 122. The burner 101 is conveniently a burner utilised in a HURRICANE (Trademark) heating system manufactured by International Thermal Research Ltd. of Richmond, British Columbia, Canada.

The heating system 100 includes an exhaust jacket 103 surrounding the burner 101 which exhaust jacket 103 conveys hot exhaust to an exhaust manifold 104 and thence to a stack 110 which releases the hot gases to the atmosphere, the direction of flow of the hot exhaust being illustrated by the arrows.

A potable water jacket 110 surrounds the burner 101 and carries potable water. Cold potable water enters the water jacket 110 at cold water inlet 112 (FIG. 1B) and, after being heated by the hot gases in the exhaust jacket 103, the now heated potable water leaves at water outlet 113.

Figure 1B:
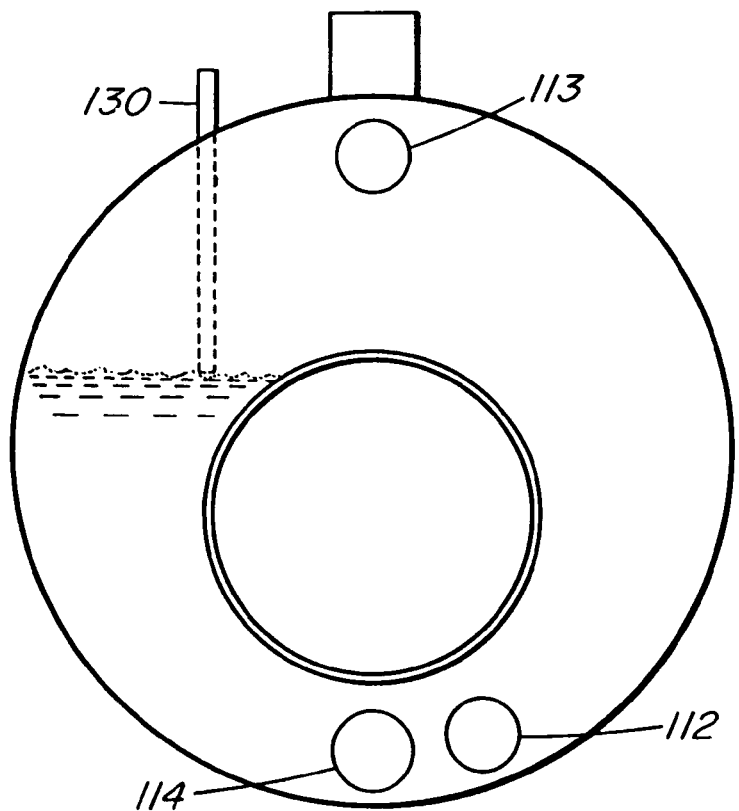

An electrical or resistance element 114 is inserted into the water jacket 110 from the end as illustrated in FIG. 1B. The electrical element 114 is a resistance type 120 volt heater and is electrically powered to assist in maintaining the temperature of the potable water when the burner 101 is not operating such as when the vehicle or boat has an independent source of power available.

The heating system 100 is pressurized; that is, the heating system 100 is a closed system. As such, there are forces acting on the end portions 120, 121 of the water jacket 110. The end portions 120, 121 are each generally convex on the outside surface and concave on the inside surfaces 126, 127 which inside surfaces 126, 127 are exposed to the potable water under pressure in the water jacket 110.

A water level sensor generally illustrated at 130 (FIG. 1B) is inserted into the potable water heater 100. Water level sensor 130 is used to sense the presence of water within the heater 100. In the event the sensor 130 does not sense water within the heater 100, a signal 131 is sent to a control board (not illustrated) which signal results in heater shutdown with the control board terminating operation of the burner 101.

Figure 3:
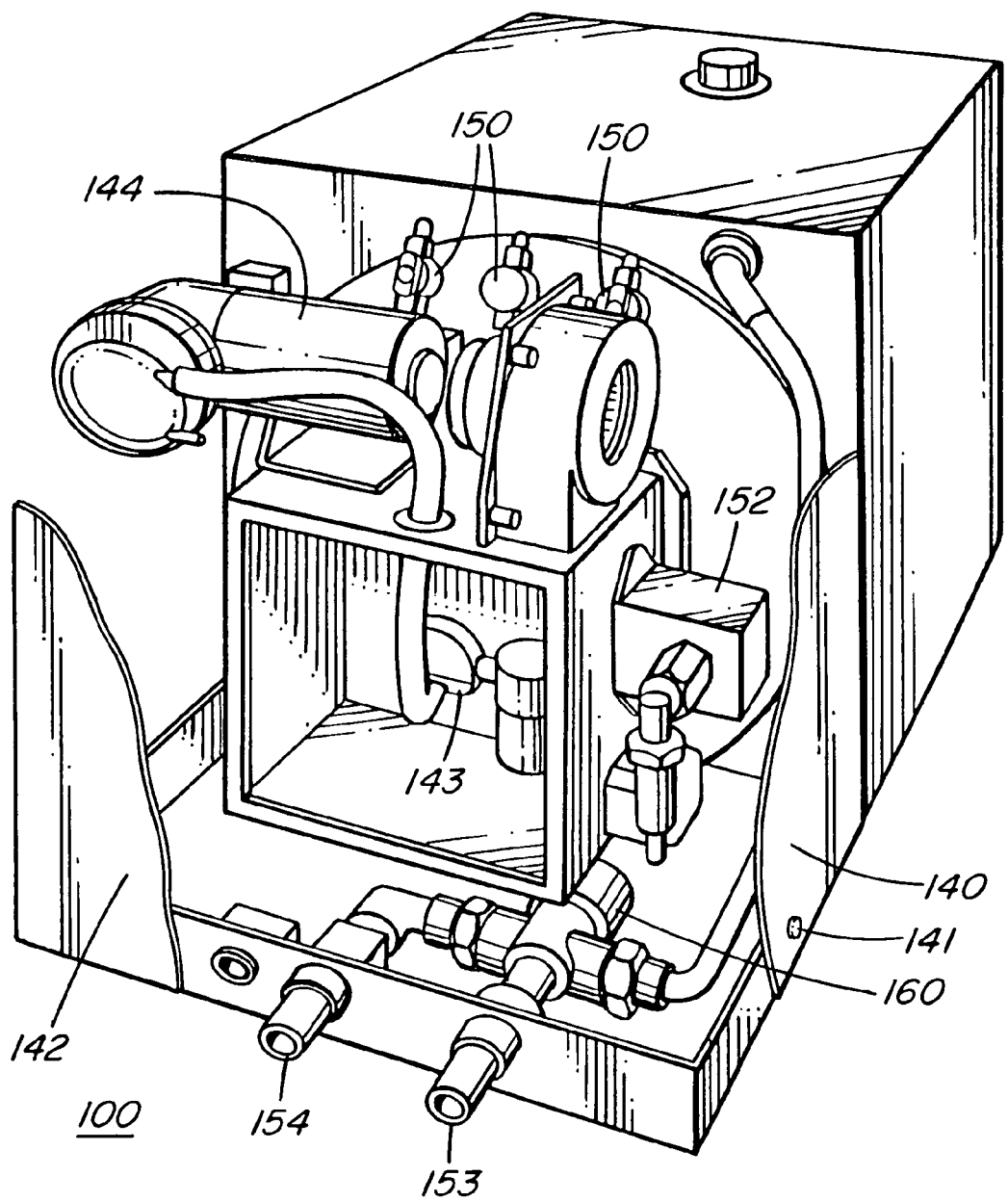
FIG. 3 is an isometric and partial cutaway view of one end of the heater according to the invention particularly illustrating the accessibility of the various components for serving and the water inlet and outlets.

Referring now to FIG. 3, one end of the heater 100 is illustrated. It will be appreciated that the heater 100 is conveniently installed in a recreational vehicle (not shown) from the end; that is, it is mounted endwise and, if servicing is required, it is conveniently done by opening access to one end of the heater 100 only so that the heater 100 need not be removed in its entirety for servicing. To that end, a single removable and peripheral wrap around panel member partially shown at 140 which covers the two sides and the top of the heater 100 is conveniently attached with removable attachments 141 (one of which is shown) such as screws, bolts and the like on opposite sides of the heater 100. A further and front panel member 142 is conveniently attached to the front of the heater 100 and is similarly easily removed by removing its attachment screws (not shown). When the end panel 142 and/or the side panel 140 are removed, the operating components of the heater 100 are readily visible and manually accessible from the end of the heater 100 and servicing is possible without the removal of the heater 100 from the recreational vehicle or boat. The burner assembly 143, the compressor 144, the aquastats 150 mounted in the water jacket and at the end of the combustion chamber, the combustion fan 151, and the fuel pump 152 are all readily accessible to a user of the heater 100 and may be removed and serviced from the end of the heater 100 without removal of the heater 100 from the vehicle in which it is installed. In addition, the cold water inlet 153 and the hot water outlet 154 are similarly conveniently located at the end of the heater 100 with a mixing valve 160 also conveniently located at the end of the heater 100 for access.

OPERATION

In operation, ignition of the fuel and air will take place as is usual, such as with the use of an ignition electrode (not shown) and a combustion flame 122 will appear in the burner tube 101 from the combustion of the pressurized air and fuel combined in the nozzle 102 (FIG. 1A). Hot gases will subsequently emanate from the combustion flame 122 and leave the end of the burner tube 101 as is shown by the arrows, the hot gases traveling first into the exhaust jacket 103 to a first stack 124 which transfers the exhaust gases to a second passageway 104 located within the water jacket 110 of the burner 100. The exhaust will exit the second passageway 104 through outside stack 110 and subsequently is released to the atmosphere.

Thus, it will be seen that the heat from the exhaust gases are used to heat the exhaust manifold 104 which manifold is in contact with the potable water within the heater 100. Additional heat is therefore provided to the potable water through the exhaust manifold 104 which, because of its location within the potable water jacket 110, will enhance the heating of the potable water prior to the exhaust gases being released to the atmosphere and improve the efficiency of the burner. A further advantage is that the stack temperature will be reduce because heat in the exhaust gases will be transferred to the potable water before the exhause gases reach stack 100.

Because the water is under pressure within the water jacket 110, the force of the water will act against the end portions 120, 121 of the water heater 100. This force may be intermittent with the result that cyclical stress arises. It has been found that having the end portions 120, 121 assume a convex outside configuration and a concave inside configuration will reduce the amplitude of the cyclic stress on heater 100. The forces acting on the end portions, therefore, are better absorbed by the housing of the heater 100.

Access to the operating components associated with the combustion in heater 100 is conveniently provided by the removable side and end panels 140, 142 respectively (FIG. 3). The user or operator may unscrew the attachment screws 141 and remove the side and top panel 140 and likewise remove the end panel 142. The burner assembly 143 may then be removed for servicing. If the other operating components need servicing or replacement such as the compressor 144, the combustion fan 151, the fuel pump 152 or the aquastats 150, their location on one end of the heater 100 conveniently provides access without removal of the heater 100 from the vehicle and without the necessity of removing panels other than those located at one end of the heater 100. Similarly, the mixing valve 160 may easily be adjusted for raising or lowering the temperature of the hot water exiting the water heater 100 from hot water outlet 154.

Figure 4:
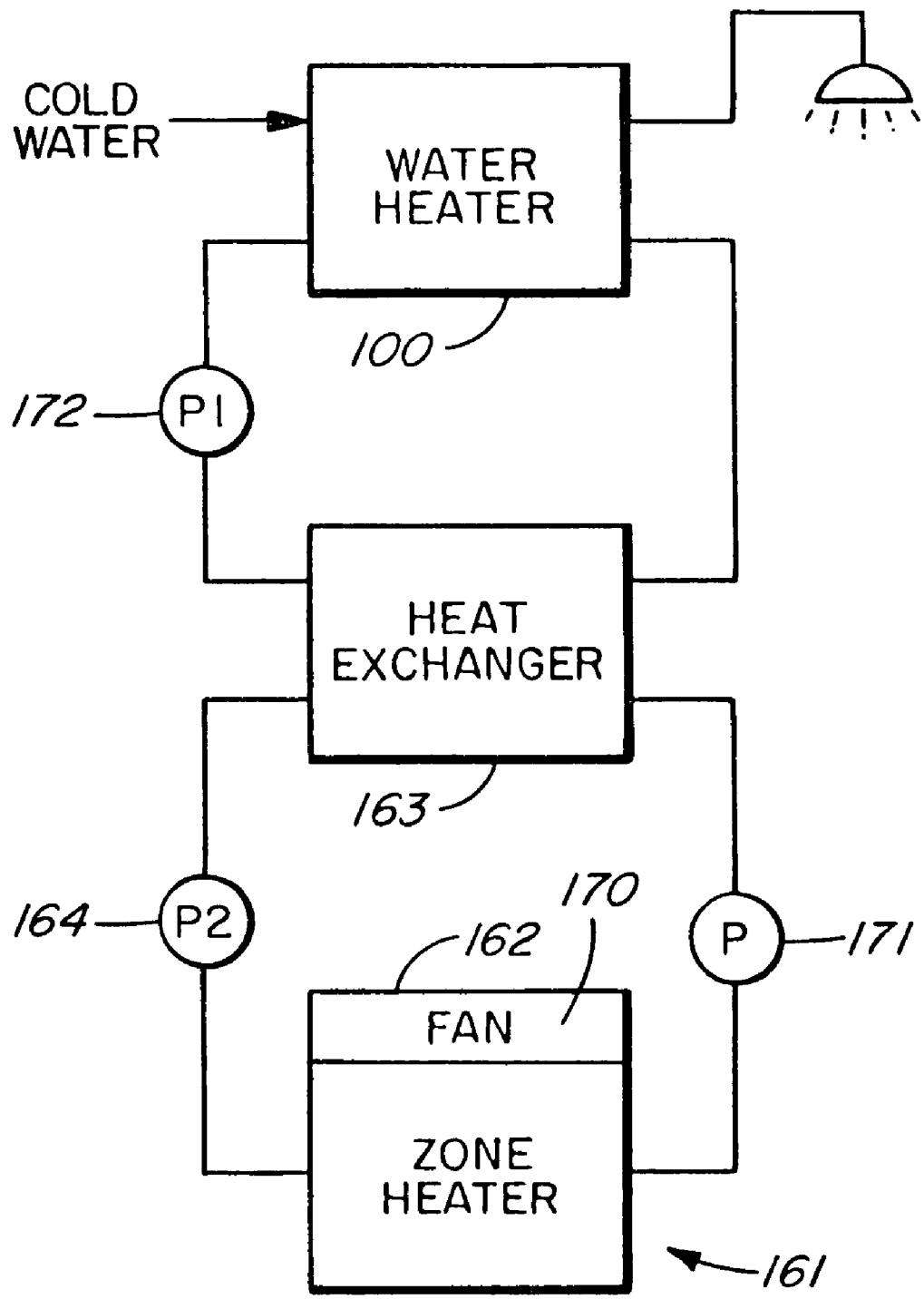
FIG. 4 is a diagrammatic schematic of a zone heater which zone heater is used in operable association with the heater according to the invention.

A further embodiment of the invention is illustrated in FIG. 4 from which a zone heater generally illustrated at 161 is operably connected to the potable water heater 100. Zone heater 161 conveniently includes a fan 162 which blows air over a radiator within the zone heater 161. A glycol mixture circulates through the zone heater 161 and a heat exchanger 163 by the use of a pump 164 which is operably connected to an aquastat 170 which measures the temperature of the circulating glycol mixture. An expansion tank 170 is conveniently provided in the circuit of the zone heater 162.

A second pump 172 and an associated aquastat 173 are provided to pump the potable water heated within the potable water heater 100 through the heat exchanger 163 thereby to exchange heat with the glycol mixture circulating through the zone heater 161. The pumps 164, 171 are initiated by a thermostat located in the zone serviced by the zone heater 161.

Figure 5B:
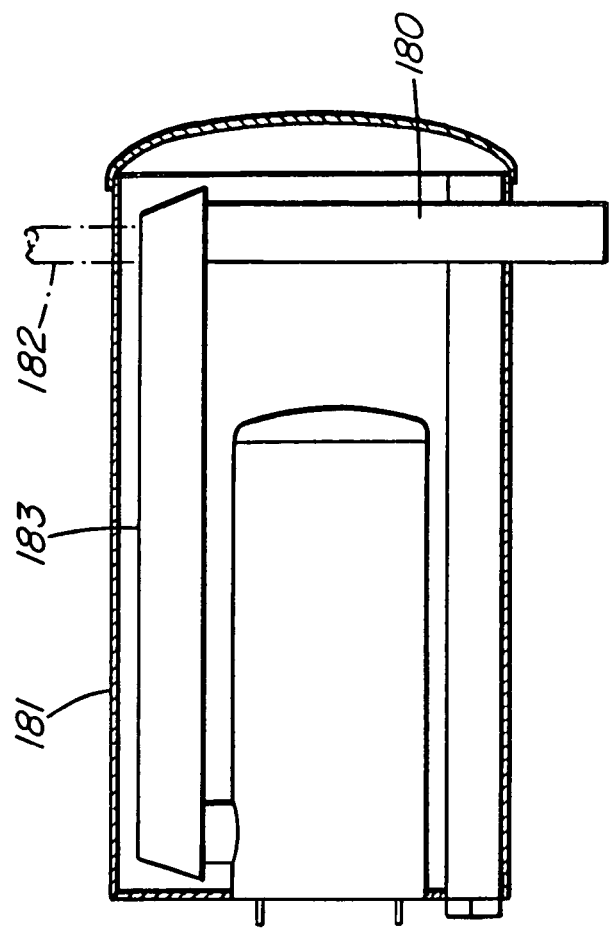
FIGS. 5A and 5B are diagrammatic end and side cutaway views of a further embodiment of the invention in which a heater according to the invention may be used in two different applications.
Figure 5A:
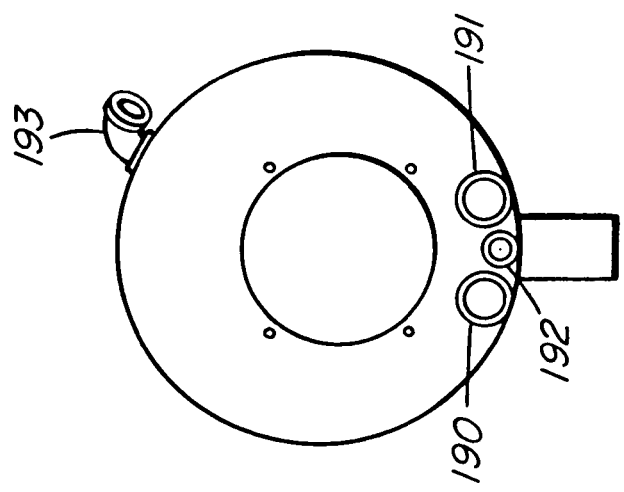

Reference is now made to FIGS. 5A and 5B which illustrate an improved efficiency heater similar to the potable water heater 100 of FIGS. 1A and 1B. In this embodiment, however, a coolant other than potable water may be used with the same efficiencies, such a coolant being, for example, glycol. A further aspect of the FIG. 5 embodiment lies in a configuration which may be adapted for heater use in two (2) installations. The first installation, as shown in FIG. 5B, incorporates a final exhaust stack 180 which extends downwardly within the heater 181 and exits the heater 181 from the bottom. This exhaust configuration may conveniently be used for recreational vehicles and other vehicles where the exhaust is routed along the bottom of the vehicle. A second final exhaust configuration is shown in broken lines at 182. A hole is cut in the top of coolant stack 183 and the final exit or exhaust stack 182 is connected and exits the top of the coolant heater 181. Electric elements 190, 191 are conveniently provided to heat the coolant when electric power is available. Cold coolant enters the coolant heater at 192 and may conveniently exit the heater 181 at 193 although ingress and egress of the coolant may be similar to that in the FIG. 1 embodiment. Other operating configurations particularly described in association with the FIG. 1 embodiment may likewise be useful in the FIG. 5 embodiment.

Figure 2:
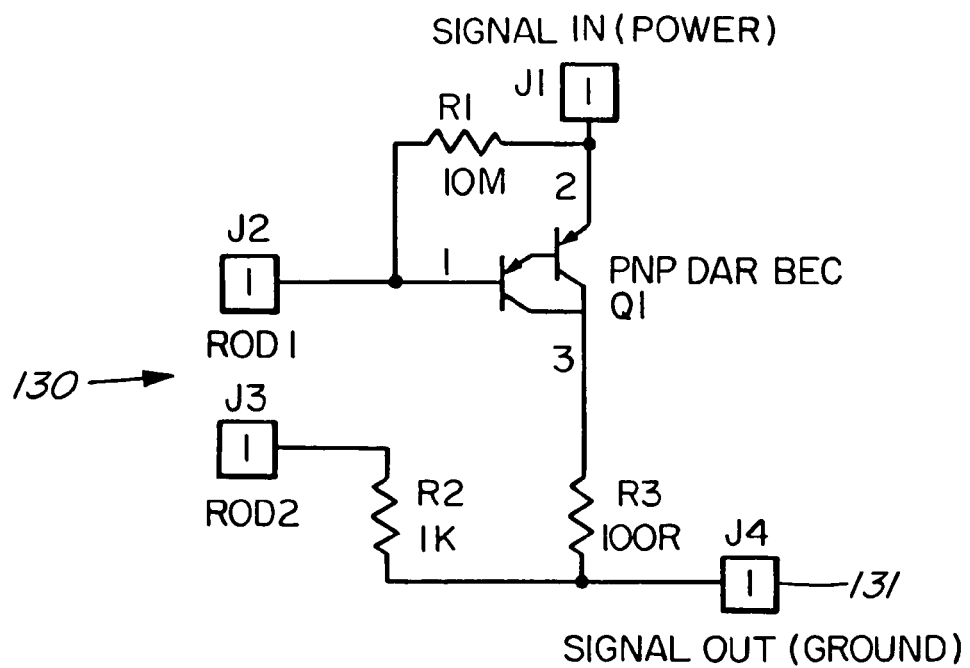
FIG. 2 is a schematic of the circuit used with the water level sensor according to a further aspect of the invention.

Many modifications will readily occur to those skilled in the art to which the invention relates. For example, although the exhaust stack is shown to be in a rectangular configuration as viewed in FIG. 2, the shape could of course change as design circumstances change and while the exhaust stack is shown as traveling down only one side of the water jacket 110, the hot exhaust could also travel within the water jacket 110 in several other configurations on various sides of the burner tube 101 and on each side of the burner tube 101 if desired. And while only one pass of the hot exhaust through the water jacket 114 is described and illustrated, more than one pass for the hot exhaust is readily contemplated.

It is further contemplated that the potable water heater according to the invention may conveniently be used in a living environment other than in marine or vehicle use. Such a heater requires initial power to initiate the combustion flame but, following that ignition, the heater could operate on minimal power or the energy generated by the heater could be used to produce the necessary power for continued operation.

Many further embodiments will readily occur to those skilled in the art to which the invention relates and the particular embodiments described are given by way of example only and are not intended as limiting the scope of the invention as defined in accordance with the accompanying claims.

I claim:

1. A hot water heater for heating water, said heater being diesel powered and comprising a burner having a longitudinal axis and an open end, said burner being operable to have combustion taking place within said burner, an exhaust jacket surrounding said burner to carry the exhaust of said combustion leaving said burner from said open end, an exhaust manifold connected to said exhaust jacket by an opening located at the end of said burner remote from said open end, said exhaust manifold being operable to carry said exhaust emanating from said burner from said opening, a water jacket carrying said water and being defined by an outer circumference of a water tank which water tank surrounds said burner, said exhaust jacket and said exhaust manifold, said water tank further being defined by concave end portions such that said concave end portions curve outwardly on opposite ends of said tank, said concave end portions being in contact with said water, said exhaust manifold running along a length of said water jacket from said opening through said water jacket and being generally parallel to the axis of said burner, said exhaust manifold carrying said hot exhaust through said water jacket and discharging said hot exhaust from said exhaust manifold to an exhaust stack located remotely from said opening.

2. A hot water heater as in claim 1 wherein said heater is for boats or vehicles.

3. A hot water heater as in claim 1 wherein said heater is for residential use.

* * * * *